Oct. 23, 1962  M. V. PARSHALL  3,059,973
ANTI-SKID DEVICE
Filed Nov. 18, 1960  3 Sheets-Sheet 1

INVENTOR.
Millis V. Parshall
BY
His Attorney

INVENTOR.
Millis V. Parshall
BY
His Attorney

United States Patent Office 3,059,973
Patented Oct. 23, 1962

3,059,973
ANTI-SKID DEVICE
Millis V. Parshall, Pontiac, Mich., assignor to General Motors Corporation, Detroit, Mich., a corporation of Delaware
Filed Nov. 18, 1960, Ser. No. 70,309
7 Claims. (Cl. 303—21)

This invention relates to a vehicle braking means and more particularly to an anti-skid device operating with the braking system.

With a vehicle coasting, in other words, when the vehicle is neither under a driving or braking condition wherein forces are applied to the tires, the tires may be said to be truly rolling by which there is no relative movement between the tire and the road at contact. With either a propulsive or braking force applied, this no longer true, rather the tire creeps relative to the road surface during contact, and velocity of the creep increases with the force applied up to some maximum value, the exact degree depending on many factors.

If all tires of a vehicle could be held at this value, maximum possible deceleration would be obtained. However, this is an unstable condition and is ordinarily impossible to maintain. Brake application greater than this critical value causes slip with an actual decrease of braking force which in turn aggravates the slip and very soon a locked wheel results. Thus, creep is relatively a stable condition and may be characterized as normal, while slip is an unstable and degenerative condition characterized by rapidly increasing angular deceleration of the road wheel until lock-up ensues. When one or more wheels "lock," with others continuing to roll though still subject to braking forces, a "skid" may ensue. If both front wheels lock a "skid" is almost certain and is completely uncontrollable so long as they remain locked. Conversely, if all wheels continue to roll, even though brakes are applied, the vehicle will not "skid" except under extraordinary circumstances. Hence, the way to prevent a skid to prevent wheel lock, while still maintaining effective braking.

The actual magnitudes of the lapse of time for the whole degenerative process is difficult to evaluate because of the difficulty of pin-pointing where it begins, but in extreme cases it appears to be between 75/100 to 9/10 of a second. These tests have been indicated under conditions where the vehicle was loaded and the pavement was moist or wet. In other tests wherein the vehicle was unloaded and the pavement was dry, it appears that the time interval is substantially less.

The provision of an anti-skid device to prevent the slipping of a vehicle wheel operates by sensing a rapid deceleration of the vehicle wheel relative to the linear deceleration of the vehicle. Accordingly, this invention is intended to sense such a change in relationship of forces created by the deceleration of the wheel relative to the deceleration of the vehicle and thereby counteract the slipping condition by decreasing the braking force on the slipping wheel.

It is an object of this invention to provide an anti-skid device which senses the slippage of a vehicle wheel associated with a corresponding brake and thereby control the braking force through the flow of the brake actuating fluid to the associated braking wheel.

It is another object of this invention to employ a rotor mounted on an axis parallel with a rotor support member to sense a change in the rotational acceleration or deceleration of a vehicle wheel relative to the linear acceleration or deceleration of a vehicle and thereby control the actuating force on the associated vehicle wheel brakes.

A further object of this invention is to provide in an anti-skid device a rotor which is rotated about a vertical axis in response to the rotation of a vehicle wheel, and senses a changing ratio between rotational acceleration and linear acceleration thereby controlling a valve means for the fluid supply for actuation of the vehicle brakes on the associated wheel.

The objects of this invention are accomplished by mounting an anti-skid device on a vertical axis normal to the axis of the vehicle wheel. A rotor is positioned in the anti-skid device which is geared to the axle of the vehicle wheel. A gimbal ring support pivoting about a parallel axis to the rotor axis supports the rotor and pivots forwardly or rearwardly to control a valve means for actuation of the vehicle brakes. The driving gear train provides an accelerating or decelerating force to increase or decrease the rotational velocity of the rotor in direct response to angular acceleration or deceleration of the vehicle wheel. When a slippage occurs on the associated vehicle wheel, the relationship of rotational and linear acceleration is upset which in turn pivots the gimbal ring actuating a control means for the valve in the conduit means supplying pressurized fluid to the associated brake chamber for actuation of the vehicle wheel brakes. In this manner, the braking effort on the vehicle wheel is reduced to a point where the wheel again rotates normally and the relationship of rotational and linear accelerations are again corrected to normal.

Further objects and advantages of the present invention will be apparent from the following description, reference being had to the accompanying drawings, wherein a preferred embodiment of the present invention is clearly shown.

Figure 1:
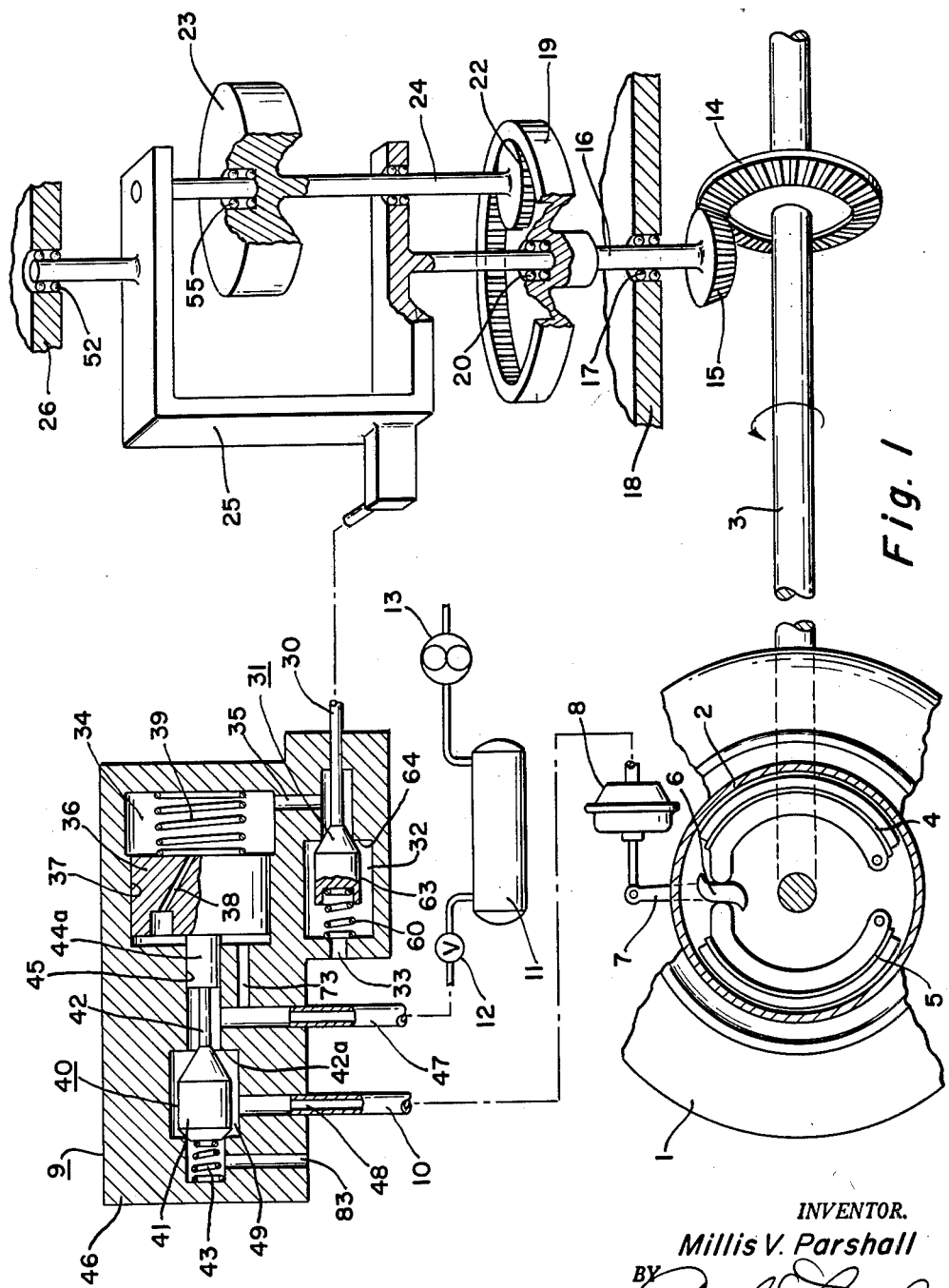
FIGURE 1 is a schematic diagram illustrating a gear train, the rotor, and the gimbal ring as well as the control means for the valves in the fluid actuating line to the vehicle brakes.

Referring to FIGURE 1, the schematic diagram illustrates the relation of the component parts of the anti-skid device. The wheel carries a tire 1 which contacts the road surface and rotates with the brake drum 2. The wheel is driven by the drive shaft 3. The brake shoes 4 and 5 frictionally engage the inner periphery of the drum 2 in response to rotation of the cam 6 by the arm 7. The arm is actuated through the brake chamber 8 which is connected to the auxiliary valve means 9 with the conduit means 10. The valve means 9 is in communication with the pressurized air supply 11 through the manual control valve 12. The air supply is maintained by a pump 13.

A drive shaft 3 supports a bevel gear 14 which engages a bevel gear 15. The bevel gear 15 rotates on a vertical axis and is connected to a shaft 16 which is mounted in a bearing assembly 17 in the shaft housing 18. The shaft 16 is connected to a ring gear 19 which rotates about a bearing assembly 20. The ring gear 19 meshes with a pinion 22 connected to a rotor 23 by a shaft 24. A gimbal ring 25 is rotatably supported in a housing 26 and the center portion of the ring gear 19. The axis of the gimbal ring 25 is parallel with the axis of the rotor 23. Upon rotation of the gear train an accelerating force is transmitted to the pinion 22 for rotation of the rotor 23.

The gimbal ring is connected by a push rod 30 connected to the primary poppet valve 31. The primary poppet valve 31 is located within a valve chamber 32 which is in communication with the atmosphere through the port 33. Valve chamber 32 is also in communication with the chamber 34 by a passage 35.

Piston 36 operates within the cylinder 37 and is formed with an orifice 38 extending through the piston 36. The piston 36 is biased to a position as illustrated by the spring 39. The secondary poppet valve 40 is biased to the position shown by the spring 39 acting through the piston 44a and the valve stem 42 against the force of spring 43. In this position the secondary poppet valve 40 is open permitting passage of pressurized fluid from the air supply 11 to the brake chamber 8 when the control valve is open.

Figure 2:
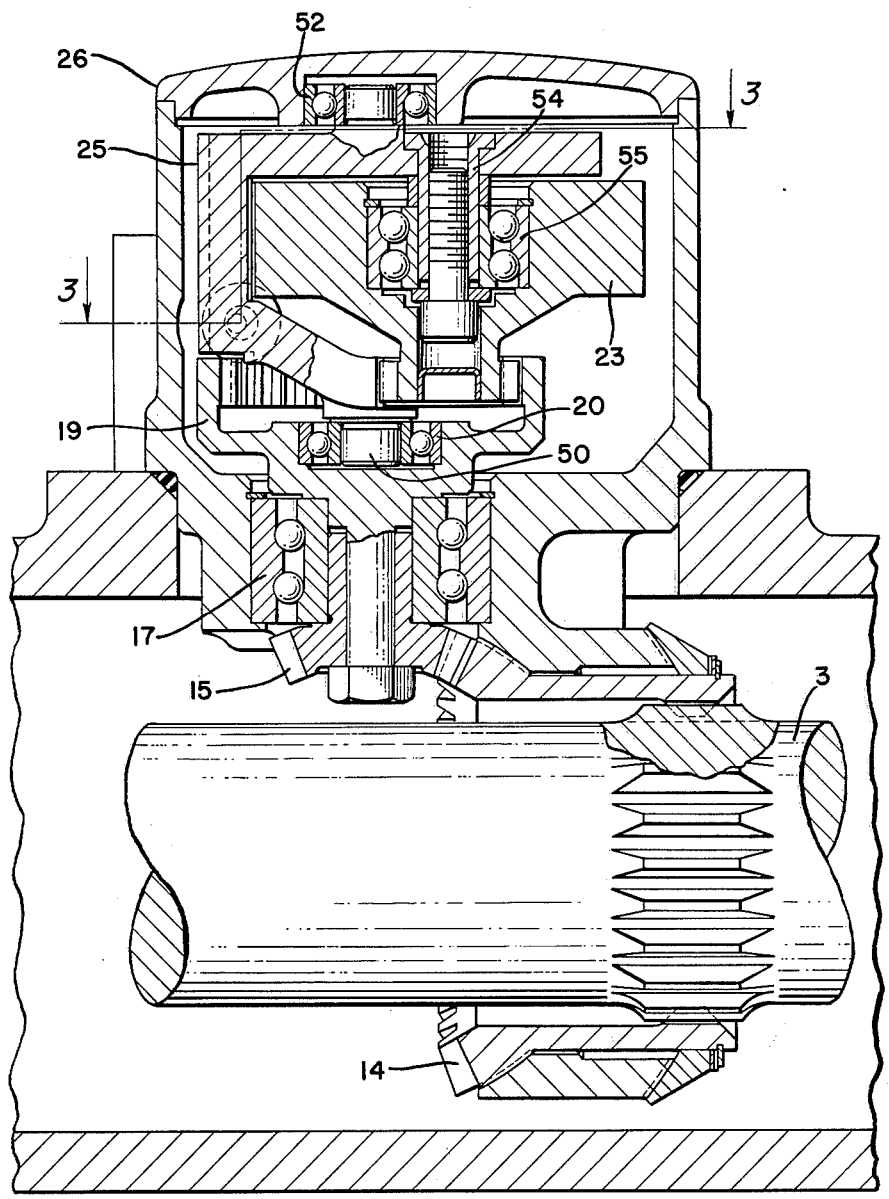
FIGURE 2 is a cross-section view of the gear train gimbal ring.
Figure 3:
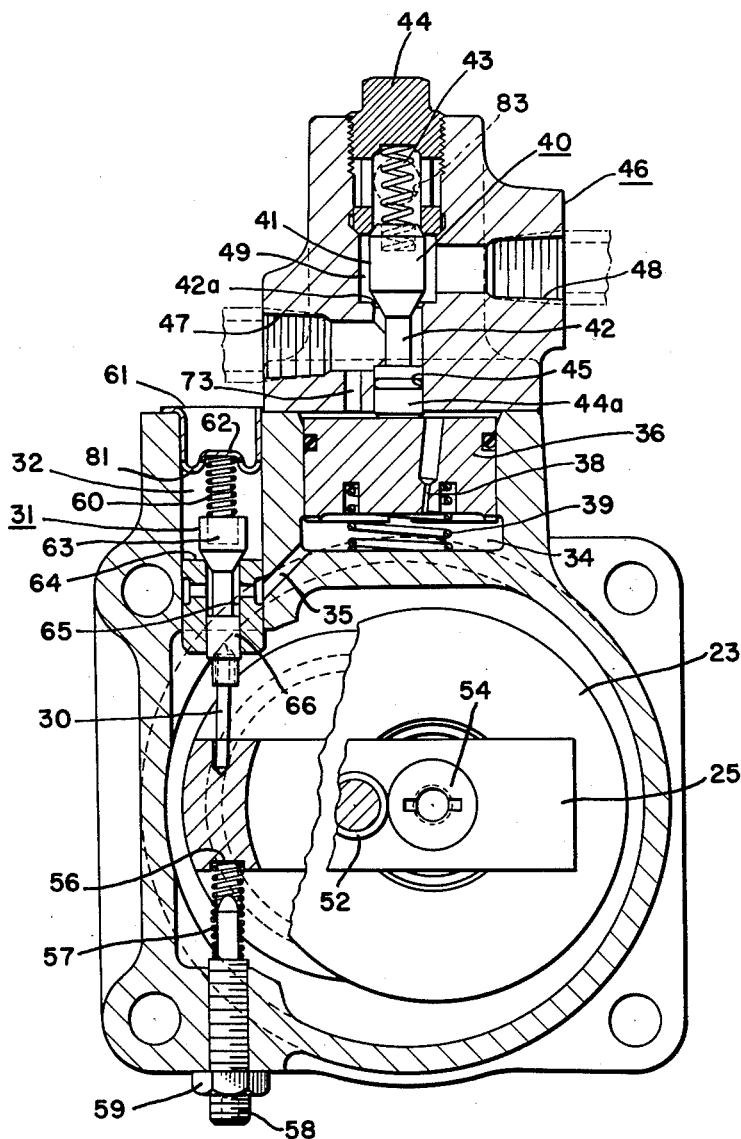
FIGURE 3 is a cross-section view of the valve arrangement in the fluid actuating conduit means for the associated vehicle wheel brake.

The general function of the anti-skid device is controlling the pressurized fluid to the brake chamber for releasing or actuating the braking effort in response to slipping of the vehicle wheel. A more detailed illustration of the structure in the anti-skid device is illustrated in FIGURES 2 and 3. Referring to FIGURE 2, the gear train between the drive shaft and the rotor is shown in cross-section.

The drive shaft 3 is connected to the bevel gear 14 which operates the bevel gear 15, the bevel gear 15 being connected to the ring gear 19 and is rotatably mounted on the bearing assembly 17. The ring gear 19 is also rotatably mounted on the bearing assembly 20 placed on the outer periphery of the stem 50 of the gimbal ring 25. The gimbal ring 25 is also rotatably mounted in the bearing assembly 52 within the housing 26. The rotor is rotatably mounted within the gimbal ring 25 on the shaft stub 54 extending into the bearing assembly 55 which rotatably supports the rotor 23. From the illustration in FIGURE 2, it would appear that by rotation of the bevel gears 14 and 15 that either the rotor or the gimbal rings may rotate. While this situation is true, the gimbal ring is biased to a central position as illustrated in FIGURE 3.

FIGURE 3 is a cross-section view of the valve structure and the gimbal ring together with the biasing structure for maintaining the central position of the gimbal ring. It is noted that rotor 23 is rotatably mouned on the gimbal ring 25 about an axis parallel with the axis of rotation of the gimbal ring. The gimbal ring is formed with a recess 56 for reception of an adjusting spring 57 which is mounted on the adjusting bolt 58 which is locked with the housing by the lock nut 59 when the proper adjustment is made. Acting in opposition to the adjusting spring 57 is a primary poppet valve spring 60 which is mounted on a thimble 61. Thimble 61 has a recess 62 for reception of the primary poppet valve spring 60. The opposite end of the primary poppet valve spring 60 is received within the poppet valve element 63. The poppet valve element seats on the valve seat 64 in its closed position, the valve element 63 and valve seat 64 forming the primary poppet valve 31. A primary poppet valve element 63 extends into a cylindrical opening 65 in the valve seat 64. A mating portion 66 maintains axial alignment within the cylindrical opening 65 between the valve element 63 and the valve seat 64. A push rod 30 engages the gimbal ring 25 and the valve element 63 maintaining a biasing force in opposition to the adjusting spring 57. The opposing forces of the spring 60 and spring 57 tend to maintain a central position for the gimbal ring 25 when normal forces are acting on the anti-skid device.

The secondary poppet valve 40 comprises a valve element 41 operating against a valve seat 42a. The valve element 41 is biased to a seating position by the secondary valve spring 43 operating against the end plug 44. The secondary valve element 41 has an extended portion forming a piston 44a for reception within the cylinder 45 formed by the valve housing 46. An inlet passage 47 is formed in the valve housing to the portion adjacent the valve seat 42a and the valve element 41. A second passage 48 is also in communication with the valve chamber 49 and leads to the conduit means 10 and the brake chamber 8. The piston 44a is biased to a contacting position against the piston 36 by the spring 43.

The piston 36 is biased to a position as illustrated by the spring 39. The spring 39 creates a greater force than the spring 43 thereby biasing the piston 36 to the position as illustrated. The piston 36 in the position as shown has normally equal pressures on opposing sides of the piston due to the movement of pressurized fluid through the passage 73 and the orifice 38.

Vehicle brakes are operated through the manual control valve 12 which permits the flow of pressurized fluid from the air supply 11 through the valve assembly 19 to the brake chamber 8 which in turn actuates the vehicle brake.

The anti-skid device as illustrated operates to counteract slipping of a vehicle wheel during the braking cycle. It can be seen that the assembly of the rotor and the chain of gears can respond to rotation in either of two ways or a combination of both. The rotor 23 and the gimbal 25 may revolve as a unit about the gimbal axis or the rotor may spin about its own axis. Actually, however, the gimbal is yieldably restrained due to the biasing force of the springs 60 and 57 to a central position in a plane substantially normal to the direction of travel of the vehicle. While so restrained, the rate of spin of the rotor 23 is, of course, directly proportional to the rate of rotation of the associated road wheel 1 and their respective rates of angular acceleration are likewise proportional. Moreover, so long as no slippage occurs as between the associated tire and the road, these angular velocities and accelerations are respectively proportional, in a substantially fixed ratio, to the linear velocities and accelerations of the vehicle. Effectively, in the absence of any slippage, the rotor may be said to be geared to the road.

Referring to FIGURE 2, it may be seen that if the vehicle be accelerated in a forward direction, the mass of the rotor 23 and gimbal 25 being subject to the same linear acceleration will exert a clockwise moment about the axis of the gimbal 25 directly proportional to the linear acceleration. Again it may be seen that if the associated road wheel 1 be angularly accelerated, the rotor 23 will also be angularly accelerated in direct proportion to the ratio of the gear train. Thus, a torque is required due to the flywheel effect of the rotor and pinion acting in the direction of an acceleration causing a moment about the axis of the gimbal. Then by providing the proper physical proportion as between the mass of the rotor and the gimbal assembly, the polar moment of the inertia of the rotor, and the angular velocity ratio of the gear train and the rolling radius of the associated tire, the resulting algebraic sum of the above separately considered moments may be made to be substantially zero. Expressed otherwise the moments acting are simultaneously equal in magnitude but opposite in direction. Thus, during normal operation of the vehicle, the only net moment tending to rotate the gimbal about the position shown will be due to the frictional losses which can be made negligibly small. While the above analysis specifies velocities and accelerations in the forward direction, it also holds true with respect to the rearward direction, since the individual forces considered then also reverse direction.

As the vehicle wheel is travelling and no driving force or braking force is applied to the tires, the tires may be said to be truly rolling where there is no relative movement between the tires and the road. Where a propelling force or a braking force is applied, a certain degree of slip is encountered between the tire and the road surface. The greater the force applied on the wheel, the greater the creep until the point is reached where the maximum creep possible is reached. At this point, the tire begins to slip on the road surface, and wheel deceleration rapidly increases until a locked wheel ensues. Unless braking torque is reduced, this angular deceleration due to slip is transmitted through the gear train to the rotor. The decelerating force causes the rotor to rapidly increase angular deceleration which is entirely unrelated to the linear deceleration of the vehicle and relates only to the slip caused by the braking torque. The rotor 23 tends to continue spinning at a constant rate, but being forced to rapidly slow down, its pinion tends to "walk-around" inside the ring gear carrying the gimbal ring with it. But the gimbal cannot swing around its axis until it overcomes the spring bias restraining it. By adjustment of screw 58 the gimbal ring can be allowed to swing at any desired value of slip deceleration; which is to say, that the instrument has sensed the precise degree of slip required or desired, whereupon it opens the primary poppet valve 31 thereby initiating a corrective cycle.

It can be seen that with the opening of the primary poppet valve 31 a passage is open from the space below the piston 36 through the passage 35, the valve chamber 32 and the openings 81 in the thimble 61 to atmosphere. Until this instant, the air space in the chamber 34 below the piston 36 has been at brake chamber pressure through the orifice 38. With the primary poppet valve 31 open, the pressure in chamber 34 abruptly falls since the area of the orifice 38 is small in relation to the opening 35 leading to the valve chamber 32. Since the top face of the piston 36 is still subject to the brake chamber pressure, the piston is forced into the chamber 34. The secondary poppet valve 40 which is also operated under the biasing force of spring 43 is forced to follow the piston 36 and in doing so cuts off the passage from the service line connected to passage 47 and the brake chamber conduit 10. The movement of the secondary poppet valve element 41 to engage a secondary poppet valve seat 42a also opens the passage from brake chamber conduit 10 to the passage 83 venting the brake chamber to atmosphere.

The interval from the instant of opening of the primary valve 31 to the opening of a secondary valve 40 is very short, but during this interval and for an indeterminate interval thereafter, the "slip deceleration" continues to increase, until such time as the brake pressure has fallen sufficiently to cause the net torque acting on the road wheel to cease to increase. Up to this instant, the torque on the rotor pinion 22 has been increasing and the motion of the gimbal rings and the primary valve 31 accelerating, however slightly, while the piston 36 and the secondary valve 40 remain in the closed position with air continuing to exhaust from the brake chamber. The brake pressure quickly falls to a point where the net torque acting on the road wheels reverses direction and starts to increase in the opposite sense. Then the force exerted by ring gear 19 on the rotor pinion 22 reverses and creates an opposite torque on the gimbal which closes the primary valve 31. When the primary valve 31 closes, the previous sequence of control events is enacted in reverse order and the air pressure from the service line is readmitted to the brake chamber thereby completing the cycle.

Ideally, the closure of the primary poppet valve 31 should occur at such a time that the brake chamber pressure has built up to a value corresponding to the "tire creep" range at the same time that the wheel returns to the corresponding angular velocity. In like manner, it should open early in the "slip range" so that correction may occur before excessive slippage with the corresponding decrease in braking effort ensues. The opening point may be determined as explained. Once the gimbal has started to swing, however, its motion for a preterminated period of time depends primarily on three factors, the pattern of motion of the road wheel, the moment of inertia of the rotor, and the spring constants or resultant rate of the springs 57 and 60 on the gimbal suspension. The rotor moment of inertia is fixed, and the pattern of inertia of the road wheel, of course, depends upon many variables. However, these variables determine principally the rates of change of force acting and the time intervals required. Such a system may be analyzed mathematically as well as experimentally, and the rate determined for the springs 57 and 60 is such that the motion of the gimbal will have any desired "phase lag" with respect to the pattern of motion of the road wheel. This is to say that the time interval during which the primary poppet valve 31 is open may in effect be made to occupy nearly a constant portion of the whole interval required for recover of the road wheel, for a wide range of the latter. The instrument should be able to sense not only the appropriate instant at which to initiate control but also the interval required to accomplish the same and correspondingly the appropriate instant to cease control.

While the embodiment of the invention as herein disclosed constitutes a preferred form, it is to be understood that other forms might be adopted.

What is claimed is as follows:

1. Means for prevention of skidding in a vehicle braking system comprising in combination, a vehicle wheel, a braking means having hydraulic actuating means associated with said vehicle wheel, a source of pressurizing fluid, conduit means for connecting said braking means with said source of pressurizing fluid, a manual control valve for controlling the operation of said braking means, said means for preventing skidding comprising in combination, a shaft means for rotating said vehicle wheel, a rotor, a gear train connected to said shaft means driving said rotor, a rotatable support member supporting said rotor on an axis parallel with and spaced from the support member axis, auxiliary control valve means in said conduit means including a primary valve connected to said support member and movable on rotatable movement thereof in response to a wheel linear and angular acceleration differential sensed by said support member and said rotor, a secondary valve controlling exhaust from said braking means in response to said primary valve, and passage means connecting said secondary valve to said primary valve to thereby permit exhaust of pressurized fluid from said braking means and closing of said passage means from said source of pressurized fluid to said braking means before lock up of said vehicle wheel.

2. Skid prevention means in a vehicle braking system comprising in combination, an air brake having an air chamber, a source of pressurized air, conduit means connecting said source of pressurized air with said air chamber, manual control valve means for actuating said air brakes, wheel slip control valve means including, a primary exhaust valve, a primary exhaust valve chamber in a slip control valve housing, a cylindrical air compartment in said slip control valve housing, a piston operating in said air compartment of said control valve housing and biased to a first position, conduit means connecting said air compartment to said primary exhaust valve chamber, a secondary exhaust valve in such housing and engaging said piston, a secondary exhaust valve chamber receiving said secondary exhaust valve, an orific formed in said piston, passage means connecting said secondary exhaust valve chamber with said air compartment, means biasing said secondary valve in opposition to said piston, a slip control means comprising, a gear train connected to a drive shaft rotating said vehicle wheel, a rotor, said rotor rotated by said gear train and defining a wheel angular accelerometer, a gimbal rotatably supported in a housing and defining in combination with said rotor a wheel linear accelerometer and providing rotatable mounting means for said rotor on a parallel axis with said gimbal, and means connecting said gimbal to said primary valve to exhaust air from said air compartment and permit exhaust of air from said air chamber in response to slip of the associated wheel rotating said gimbal as a function of wheel linear and angular acceleration differential when said vehicle brakes are actuated.

3. For use in a wheel brake system having a fluid pressure actuated brake unit and including fluid pressure conduit means connected to said brake unit, the improvement comprising anti-skid mechanism for altering the fluid pressure in the conduit means being delivered to the brake unit in response to a predetermined wheel linear acceleration and wheel angular acceleration differential and including, means arcuately movable about an axis normal to the wheel axis of rotation and to the direction of linear wheel acceleration, control mechanism connected with and sensitive to arcuate movement of said arcuately movable means for altering the fluid pressure in the brake system conduit means to decrease the braking force applied to the wheel, means adapted to be rotatable by the wheel about an axis parallel to and spaced from the axis of said arcuately movable means and rotatably mounted on said arcuately movable means, said wheel rotatable means providing an angular accelerometer and said wheel arcuately movable means combining with said wheel rotatable means and providing a linear accelerometer, the respective outputs of said accelerometers being in balanced relation during the rolling condition of the wheel and unbalanced during skidding conditions of the wheel to actuate said control mechanism by arcuate movement of said arcuately movable means when a predetermined wheel skidding condition is reached as determined by the wheel linear acceleration and angular acceleration differential and thus control the brake system to limit the wheel skid to that predetermined wheel skidding condition.

4. The anti-skid mechanism of claim 3, said arcuately rotatable means comprising a gimbal ring mounting for said wheel rotatable means and having opposed resilient centering means at least one of which is adjustable to set said predetermined acceleration differential.

5. The anti-skid mechanism of claim 3, said wheel rotatable means comprising an inertia weight and a weight drive gear train including a ring gear axially aligned with said arcuately movable means and a pinion driven thereby having a shaft for driving said inertia weight, said shaft being rotatably mounted in and axially parallel to the axis of said arcuately rotatable means.

6. Wheel anti-skid mechanism comprising a wheel and a wheel brake system including wheel brake means and fluid pressure brake actuating means and brake limiting control mechanism, said brake limiting control mechanism comprising first rotatable means sensitive only to wheel linear acceleration and second rotatable means sensitive to wheel angular acceleration and fluid pressure limiting means for limiting the fluid pressure to said brake actuating means and responsive to said first and second rotatable means, said second rotatable means being rotatably mounted on said first rotatable means about an axis parallel to and spaced from the axis of said first rotatable means and combining therewith to provide a wheel linear accelerometer and means connecting said first rotatable means to said pressure limiting means whereby the amount of rotary movement of said first means is transmitted thereto and provides a wheel linear and angular acceleration differential signal to said pressure limiting means to limit wheel skid.

7. The mechanism of claim 6, said first rotatable means being a gimbal ring and said second rotatable means being a balanced inertia weight.

References Cited in the file of this patent
UNITED STATES PATENTS

| | | |
|---|---|---|
| 2,491,666 | Keller | Dec. 20, 1949 |
| 2,772,904 | Doolittle | Dec. 4, 1956 |
| 2,920,924 | Reswick et al. | Jan. 12, 1960 |